(12) United States Patent
Ishii et al.

(10) Patent No.: US 6,384,984 B1
(45) Date of Patent: May 7, 2002

(54) EYEPIECE VARIABLE FOCAL LENGTH OPTICS

(75) Inventors: Shinichiro Ishii; Takayuki Ito, both of Saitama (JP)

(73) Assignee: Asahi Kogaku Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/794,906

(22) Filed: Feb. 28, 2001

(30) Foreign Application Priority Data

Feb. 29, 2000 (JP) .......................... 2000-053732

(51) Int. Cl.[7] .......................... G02B 25/00; G02B 15/14
(52) U.S. Cl. .................. 359/645; 359/433; 359/643; 359/689
(58) Field of Search ................... 359/420–422, 359/431–433, 642–647, 676–677, 689–690

(56) References Cited

U.S. PATENT DOCUMENTS

| | | | |
|---|---|---|---|
| 5,140,467 A | 8/1992 | Hotta et al. | 359/696 |
| 5,311,355 A | 5/1994 | Kato | 359/432 |
| 5,491,588 A | 2/1996 | Ogawa et al. | 359/676 |
| 5,576,892 A | 11/1996 | Hotta et al. | 359/696 |
| 5,663,834 A * | 9/1997 | Koizumi | |
| 5,734,509 A | 3/1998 | Ueno | 359/689 |
| 6,104,543 A | 8/2000 | Yano | 359/645 |

FOREIGN PATENT DOCUMENTS

| | | | |
|---|---|---|---|
| DE | 38 13 992 | * | 1/1989 |
| JP | 53-51757 | | 5/1978 |
| JP | 62134617 | | 6/1987 |

* cited by examiner

*Primary Examiner*—Thong Nguyen
(74) *Attorney, Agent, or Firm*—Greenblum & Bernstein, P.L.C.

(57) ABSTRACT

The improved eyepiece variable focal length optics comprises, in order from objective optics with which it is used in combination, a negative first lens group, a positive second lens group and a positive third lens group, the first and second lens groups moving in opposite directions along the optical axis during variable focal length but the third lens group being stationary, and the eyepiece variable focal length optics satisfies the following conditions (1) and (2):

$$2.0 < f_3/f_2 < 4.0 \quad (1)$$

$$7.0 < L_{12}/f(h) \quad (2)$$

where $f_2$ is the focal length of the second lens group, $f_3$ is the focal length of the third lens group, $f(h)$ is the shortest focal length of the overall eyepiece variable focal length optics, and $L_{12}$ is the axial air gap between the first and second lens groups at the shortest focal length. The eyepiece variable focal length optics achieves a variable power ratio of about three and yet is compact and allows for adequately large apparent visual field and eye relief.

3 Claims, 9 Drawing Sheets

EYEPIECE VARIABLE FOCAL LENGTH OPTICS

BACKGROUND OF THE INVENTION

This invention relates to eyepiece variable focal length optics for use in combination with objective optics as in astronomical telescopes, spotting scopes and binoculars.

Many proposals have so far been made in the art of eyepiece variable focal length optics of the type contemplated by the invention. For example, U.S. Pat. No. 5,491,588 proposes a focal variable focal length optics which is a combination of an eyepiece variable focal length optical system with an objective optical system and an erecting optical system. Unexamined Published Japanese Patent Application (kokai) No. 134617/1987 and U.S. Pat. No. 5,734,509 propose independent eyepiece variable focal length optics which do not include an objective optical system or an erecting optical system. The eyepiece variable focal length system, taken alone and excluding the objective and erecting optical systems, is a so-called OE-ZOOM system consisting of the following three groups in order from the object side, a moving first lens group having negative power, a moving second lens group arranged to be opposed to the first lens group with a field stop interposed therebetween and having positive power, and a fixed third lens group having positive power. The first and second lens groups are moved in opposite directions not only to achieve variable focal length but also to compensate for the position of the virtual image. The conventional eyepiece variable focal length optics mentioned above can achieve variable power ratios of only about two.

Eyepiece optics are generally required to have adequate eye relief and offer a satisfactorily large apparent visual field; however, if this need is met, the optics are prone to become bulky. This tendency becomes noticeable as the variable power ratio approaches three.

SUMMARY OF THE INVENTION

An object, therefore, of the invention is to provide eyepiece variable focal length optics that achieves a variable power ratio of about three and which yet is compact and allows for adequately large apparent visual field and long eye relief.

This object of the invention can be attained by eyepiece variable focal length optics which comprises, in order from objective optics with which it is used in combination, a negative first lens group, a positive second lens group and a positive third lens group, the first and second lens groups moving in opposite directions along the optical axis during variable focal length but the third lens group being stationary, and the eyepiece variable focal length optics satisfying the following conditions (1) and (2):

$$2.0 < f_3/f_2 < 4.0 \quad (1)$$

$$7.0 < L_{12}/f(h) \quad (2)$$

where $f_2$ is the focal length of the second lens group, $f_3$ is the focal length of the third lens group, $f(h)$ is the shortest focal length of the overall eyepiece variable focal length optics, and $L_{12}$ is the axial air gap between the first and second lens groups at the shortest focal length.

When the overall eyepiece variable focal length optics is set at the shortest focal length state, a telescope using the eyepiece variable focal length optics in combination with the objective optics provides the highest magnification, assuming that the objective optics has a fixed focal length. Of course, the objective optics may be constructed as a variable focal length objective optics to further increase the highest magnification.

Preferably, the second lens group contains at least two positive lens elements and satisfies the following condition (3):

$$0.3 < f_2/f_{2-1} < 0.6 \quad (3)$$

where $f_{2-1}$ is the focal length of the positive lens in the second lens group which is positioned the closest to the objective optics (if said positive lens is part of a cemented lens, $f_{2-1}$ is the focal length of the cemented lens).

The present disclosure relates to subject matter contained in Japanese Patent Application No. 2000-53732 (filed on Feb. 29, 2000), which is expressly incorporated herein by reference in its entirety.

THE PREFERRED EMBODIMENT OF THE INVENTION

Figure 17:
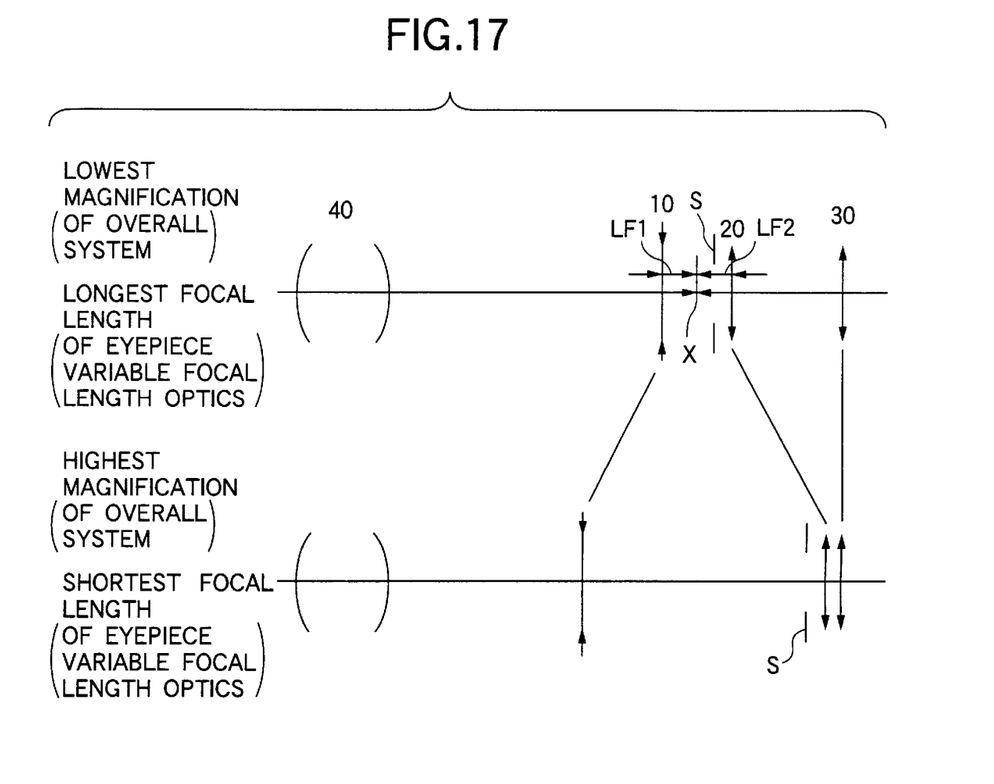
FIG. 17 shows in simplified diagrams how lens movement is done by the eyepiece variable focal length optics of the invention.

As shown in FIG. 17, the eyepiece variable focal length optics according to the embodiment under consideration is to be used in combination with objective optics 40 and comprises, in order from the objective optics (object) side, a negative first lens group 10, a field stop S, a positive second lens group 20 and a positive third lens group 30. During variable focal length, the first lens group 10 and the second lens group 20 move in opposite directions along the optical axis but the third lens group is stationary. Stated more specifically, when the magnification of the overall optics (the ratio of the focal length of the objective optics 40 to that of the eyepiece variable focal length optics) changes from minimum to maximum (i.e., when the focal length of the eyepiece variable focal length optics changes from the longest to the shortest), the first lens group 10 moves toward the object whereas the second lens group 20 moves toward the eye. The field stop S moves with the second lens group 20.

Condition (1) should be satisfied to realize size reduction of the eyepiece and it is characterized by dictating that the power (the reciprocal of the focal length) of the second lens group is comparatively greater than that of the third lens group.

If the lower limit of condition (1) is not reached, the amount of movement of the second lens group increases and this is unfavorable to the purpose of size reduction. If the upper limit of condition (1) is exceeded, it becomes difficult to correct aberrations, in particular, astigmatism and distortion.

Condition (2) should be satisfied in order to ensure that the space in which the first and second lens groups move during variable focal length is large enough to produce an increased variable power ratio. As another advantage, if this condition is met, the distance to the first lens group from the object image formed between the first and second lens groups (in the focal position of the objective optics) and the distance from such object image to the second lens group are each increased, making the flaws and dust on the lens surfaces less noticeable.

A specific discussion follows. In a telescope or the like, the eyepiece optics is, in general, designed to form a virtual image at a position of about −1 diopter from a person viewing a real image formed by the objective optics in order to readily observe the real image. Therefore, if a lens surface or the like is located at or close to the real image thus formed, the flaws and dust on the lens surface are consequently observed together with the real image. The diopters D1 and D2 (i.e. differences in distance that can separate positions of virtual images with respect to the lens surfaces in the first lens group 10 and the second lens group 20, which are respectively at distances LF1 and LF2 from the focal position X of the objective optics 40, from a position of a virtual image with respect to the focal position X are expressed by the following equations:

$$D1 = +1000 \times LF1/f_{23}^2 \text{ (in diopters)}$$

$$D2 = -1000 \times LF2/f_{23}^2 \text{ (in diopters)}$$

where LF1 is the distance from the focal position X of the objective optics to the lens surface of the first lens group which is the closest to the eye; LF2 is the distance from the focal position X of the objective optics to the lens surface of the second lens group which is the closest to the objective optics; and $f_{23}$ is the focal length of the optics which is closer to the eye than the focal position X of the objective optics.

Flaws and dust on a lens surface become a problem at low magnification when the focal position X is the closest to the lens surface and unless the absolute values of D1 and D2 are reasonably great, the flaws and dust will become noticeable at low magnification. In order to increase the absolute values of D1 and D2, one may increase the values of LF1 and LF2. If one wants to increase the variable power ratio at increased values of LF1 and LF2 at low magnification, the distance between the first and second lens groups at high magnification must be reasonably large so as to ensure the space in which those lens groups can be moved. If condition (2) is met, the distance between the first and second lens groups at high magnification can be made sufficiently large that the values of LF1 and LF2 are increased at low magnification to make the flaws and dust on lens surfaces less noticeable.

If the lower limit of condition (2) is not reached, the distance between the image plane and either of the two lens surfaces becomes so short at low magnification that the flaws or dust on the lens surfaces are objectionably noticeable. If one wants to ensure adequate variable power ratio and yet reduce the amount of lens group movement so that the image plane is not unduly close to either of the two lens surfaces, the power of the second lens group has to be increased but then it becomes difficult to correct aberrations such as astigmatism and distortion.

Condition (3) is relevant to the case of incorporating at least two positive lens elements in the second lens group and it relates to the power of the positive lens that is positioned the closest to the objective optics. The eyepiece variable focal length optics according to the embodiment under consideration is given strong power by the second lens group, so in order to correct aberrations, at least two positive lens elements are necessary and they desirably have substantially the same power level.

If the upper limit of condition (3) is exceeded, the power of the positive lens positioned the closest to the objective optics is so great that effective correction of astigmatism and distortion becomes difficult to achieve. If the lower limit of condition (3) is not reached, the power of the positive lens positioned the closest to the eye is unduly great, again making it difficult to correct astigmatism and distortion. Thus, it is difficult to correct astigmatism and distortion if condition (3) is not met.

For effective correction of chromatic aberration, a negative lens is preferably cemented to a positive lens.

The following examples are provided for further illustrating the present invention. In the accompanying diagrams, axial chromatic aberration is expressed in terms of spherical aberration and the d-, F- and C-lines by which the axial chromatic aberration and the chromatic difference of magnification are represented refer to the aberrations at the respective wavelengths; S and M stand for sagittal and meridional, respectively; ER means the diameter of the exit pupil and B refers to the angle in degrees an emerging ray makes with the optical axis. The symbols used in Tables 1–4 have the following definitions: W, half angle of view in degrees; fo, the focal length of the objective optics; fe, the focal length of the eyepiece variable focal length optics; r, the radius of curvature; d, lens thickness or air gap between lenses; $N_d$, refractive index at d-line; v, Abbe number. Symbol EP in FIGS. 1, 5, 9 and 13 refer to the eye point.

Figure 18:
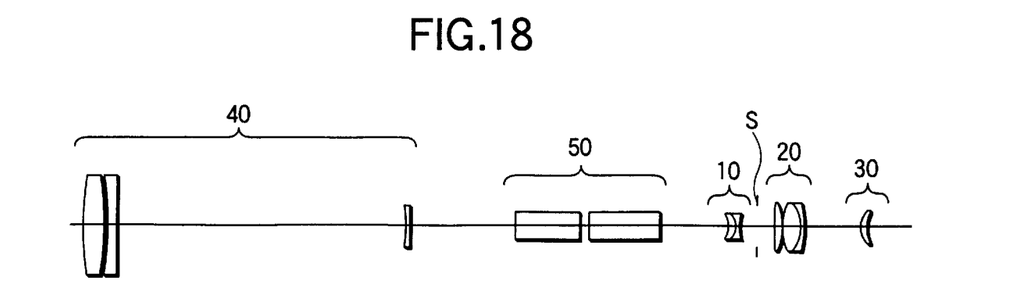
FIG. 18 shows the lens configuration of a telescope including the eyepiece variable focal length optics of Example 2 of the invention.

The numerical lens data given in the following four examples and the associated aberrational diagrams all assume the case of using the eyepiece variable focal length optics of the invention in a terrestrial telescope as combined with objective optics and an erecting prism in an unfold state that are common to the four examples and positioned ahead of the eyepiece variable focal length optics. An exemplary case is shown in FIG. 18 as a combination of the objective optics and the eyepiece variable focal length optics of Example 2. The objective optics is not limited in any particular way and those for use in astronomical telescopes and microscopes may also be employed. If no erect image is necessary, the erecting prism may be omitted.

EXAMPLE 1

Figure 1:
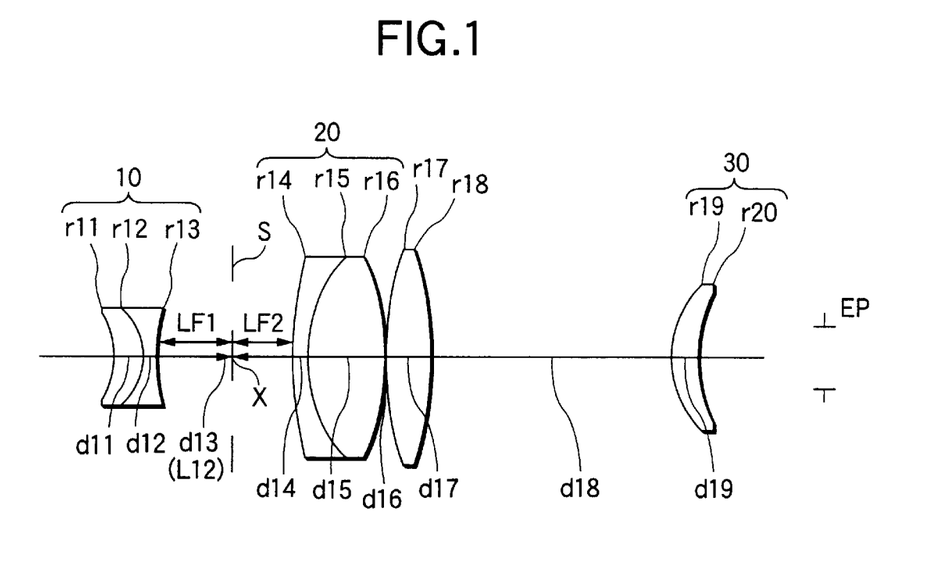
FIG. 1 shows the lens configuration of the eyepiece variable focal length optics fabricated in Example 1 of the invention.
Figure 2:
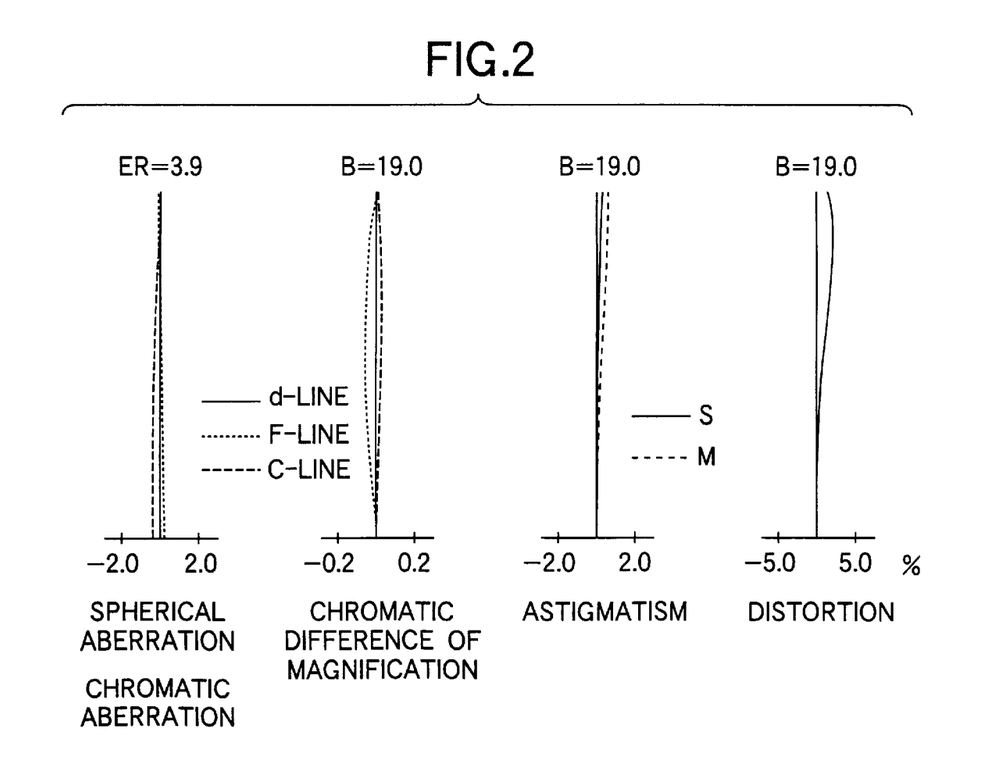
FIG. 2 is a set of graphs plotting the aberrations that occurred to a system comprising objective optics and the lens configuration of FIG. 1 as the optics of FIG. 1 was set at a longest focal length state (to provide the lowest magnification)
Figure 3:
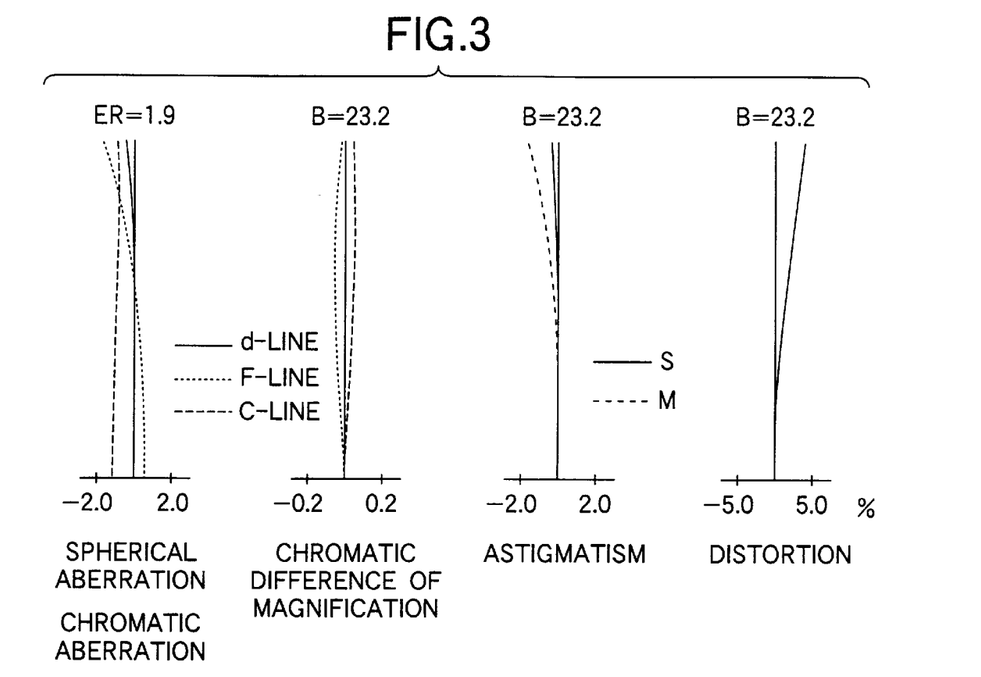
FIG. 3 is a set of graphs plotting the aberrations that occurred to the same system as the optics of FIG. 1 was set at a medium focal length state.
Figure 4:
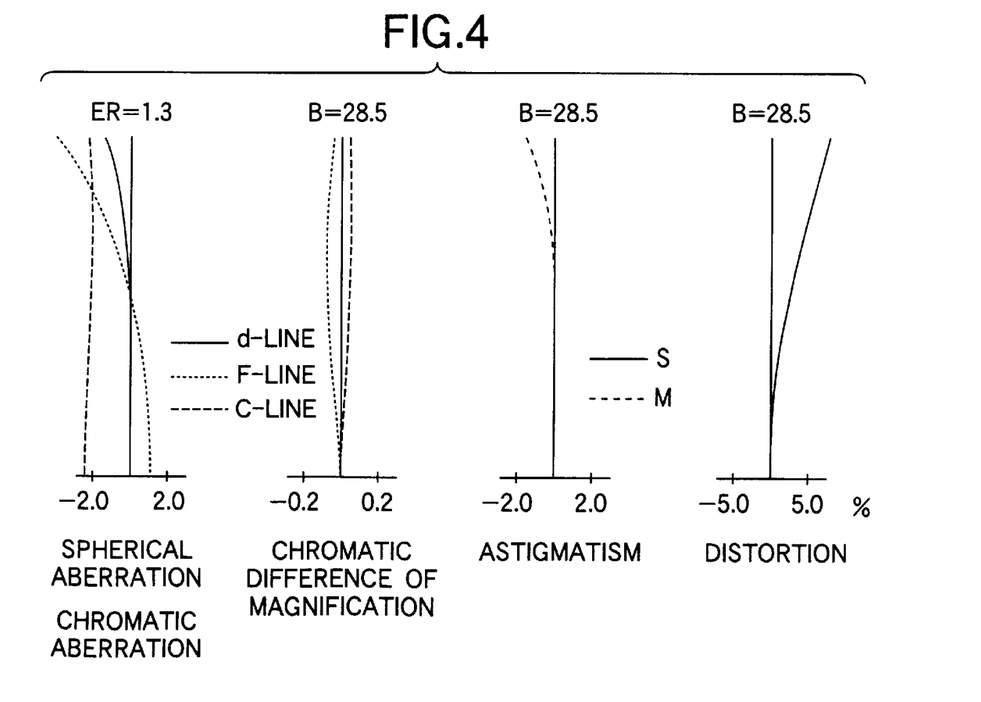
FIG. 4 is a set of graphs plotting the aberrations that occurred to the same system as the optics of FIG. 1 was set at a shortest focal length state (to provide the highest magnification)

FIG. 1 shows the lens configuration of the eyepiece variable focal length optics of Example 1 as it is set at a longest focal length state (the lowest magnification as a telescope). FIGS. 2, 3 and 4 are diagrams plotting the aberrations that occurred to the same eyepiece variable focal length optics in combination with the objective optics as the eyepiece variable focal length optics was respectively set at the longest focal length state, a medium focal length state (a medium magnification as a telescope) and a shortest focal length state (the highest magnification as a telescope). Table 1 shows the numerical data for the overall system; surface nos. 1–6 refer to the objective optics 40; surface nos. 7–10 refer to the erecting optics 50; surface nos. 11–13 refer to the negative first lens group 10; surface nos. 14–18 refer to the positive second lens group 20; surface nos. 19 and 20 refer to the positive third lens group 30. The objective optics 40 comprised, in order from the object side, a positive lens, a negative lens and a negative lens. The erecting optics 50 consisted of two triangular (right-angle) prisms each having two reflecting faces. The first lens group 10 was composed of a cemented lens comprising, in order from the objective optics side, a positive lens and a negative lens. The second lens group 20 comprised, in order from the objective optics side, a cemented lens consisting of a negative and a positive lens, and a positive lens. The third lens group 30 was composed of a single positive lens. For a shift from low to high magnification, the first lens group 10 and the second lens group 20 were moved independently of each other, the former toward the objective optics 40 and the latter toward the eye. The field stop S was placed 12.26 mm distant from surface no. 14 toward the objective optics.

TABLE 1

W = 1.0–0.6–0.5
fo = 500.0
fe = 24.4–11.7–8.3 (variable power ratio: 2.9)
Apparent field = 19.0°–23.2°–28.5° (half angle of view)
Eye relief = 21.0–20.3–27.2
Eyesight = −1 (m$^{-1}$)

| Surface No. | r | d | $N_d$ | v |
|---|---|---|---|---|
| 1 | 178.400 | 16.700 | 1.49700 | 81.6 |
| 2 | −198.400 | 2.400 | — | — |
| 3 | −198.400 | 6.000 | 1.67003 | 47.3 |
| 4 | −1583.300 | 218.800 | — | — |
| 5 | −171.700 | 2.600 | 1.51680 | 64.2 |
| 6 | −243.900 | 78.000 | — | — |
| 7 | ∞ | 47.600 | 1.51680 | 64.2 |
| 8 | ∞ | 7.000 | — | — |
| 9 | ∞ | 53.600 | 1.51680 | 64.2 |
| 10 | ∞ | 49.391–42.843–40.906 | — | — |
| 11 | −21.073 | 6.000 | 1.84666 | 23.8 |
| 12 | −14.000 | 2.500 | 1.62041 | 60.3 |
| 13 | 54.000 | 27.385–61.508–81.593 | — | — |
| 14 | 104.000 | 2.800 | 1.84666 | 23.8 |
| 15 | 33.306 | 14.620 | 1.62041 | 60.3 |
| 16 | −57.456 | 0.300 | — | — |
| 17 | 68.000 | 8.440 | 1.62041 | 60.3 |
| 18 | −96.466 | 46.771–19.188–1.030 | — | — |
| 19 | 22.152 | 5.150 | 1.58913 | 61.2 |
| 20 | 29.440 | — | — | — |

EXAMPLE 2

Figure 5:
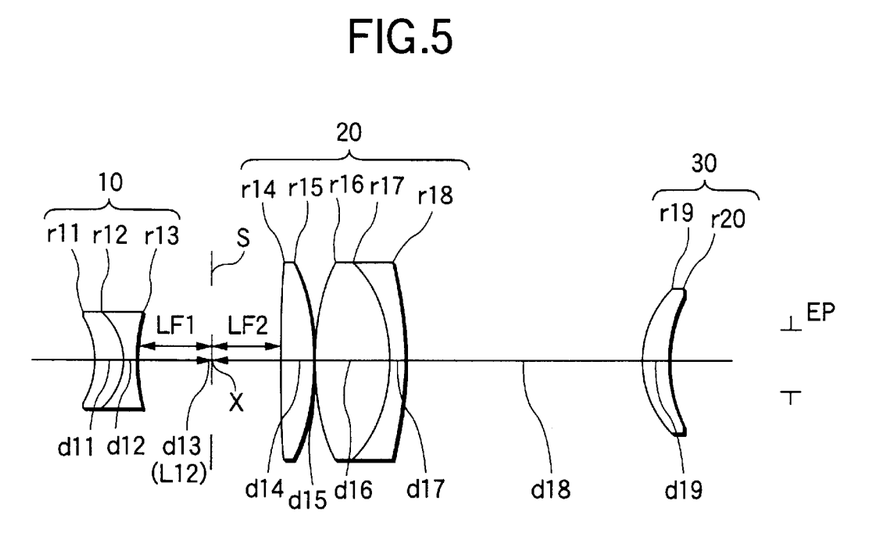
FIG. 5 shows the lens configuration of the eyepiece variable focal length optics fabricated in Example 2 of the invention.
Figure 6:
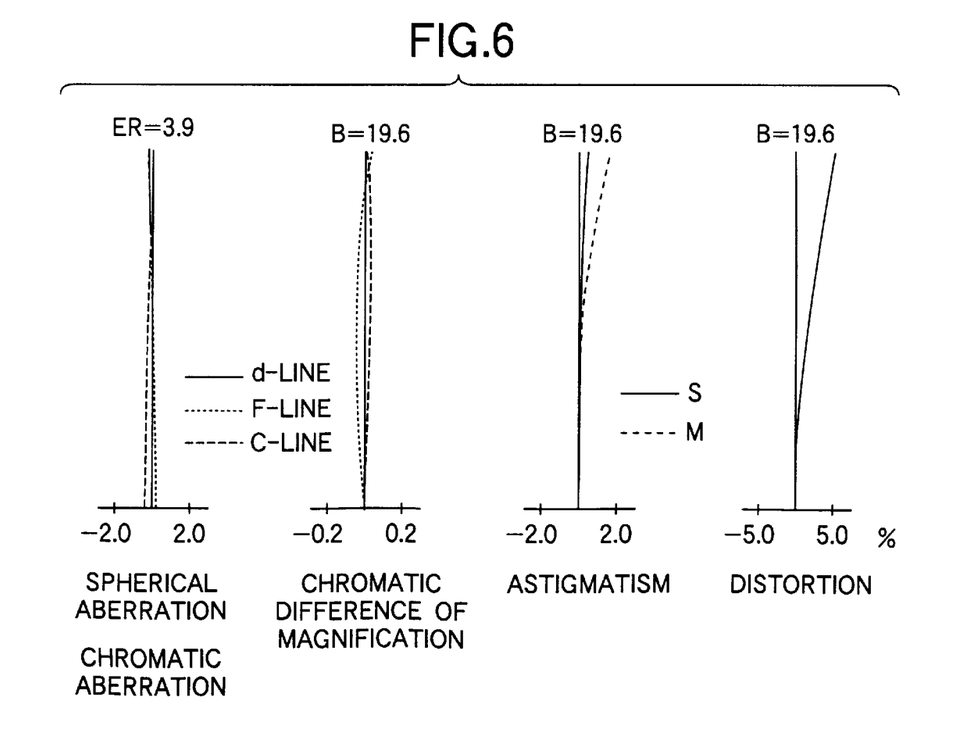
FIG. 6 is a set of graphs plotting the aberrations that occurred to a system comprising objective optics and the lens configuration of FIG. 5 as the optics of FIG. 5 was set at a longest focal length state (to provide the lowest magnification)
Figure 7:
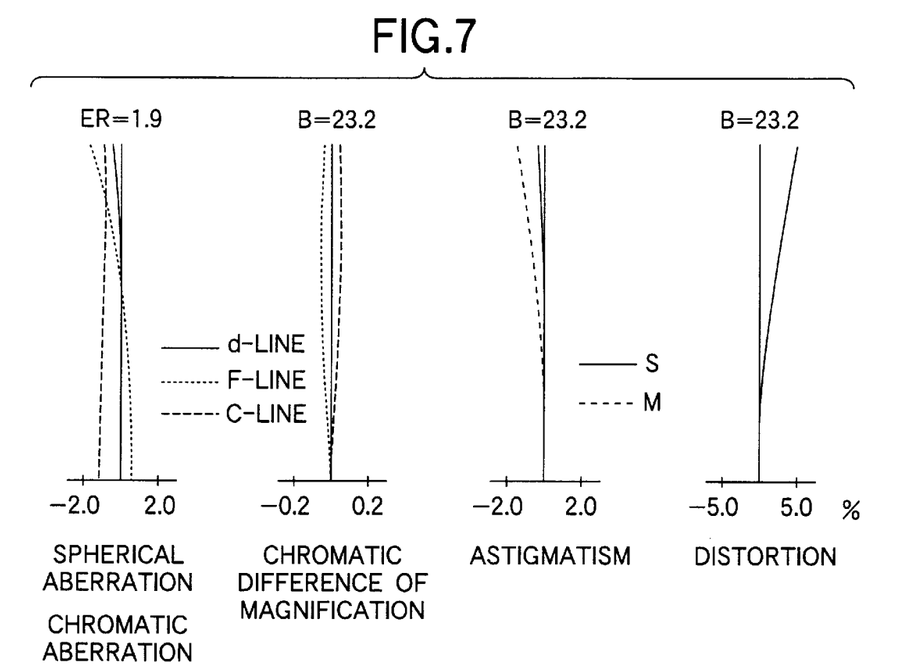
FIG. 7 is a set of graphs plotting the aberrations that occurred to the same system as the optics of FIG. 5 was set at a medium focal length state.
Figure 8:
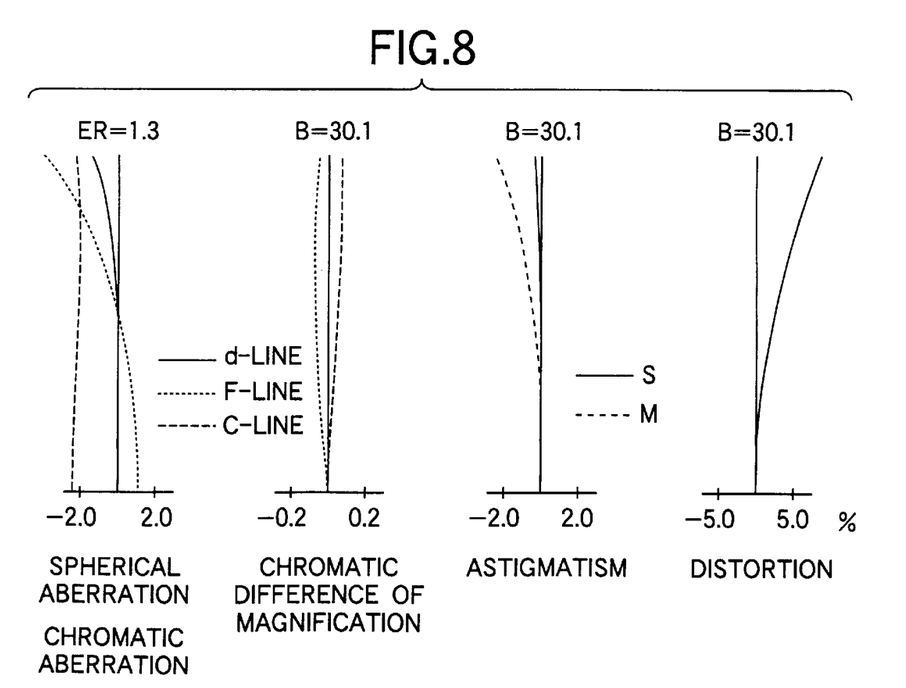
FIG. 8 is a set of graphs plotting the aberrations that occurred to the same system as the optics of FIG. 5 was set at a shortest focal length state (to provide the highest magnification)

FIG. 5 shows the lens configuration of the eyepiece variable focal length optics of Example 2 as it is set at a longest focal length state (lowest magnification). FIGS. 6, 7 and 8 are diagrams plotting the aberrations that occurred to the same eyepiece variable focal length optics in combination with the objective optics as the eyepiece variable focal length optics was respectively set at the longest focal length state, a medium focal length state (medium magnification) and a shortest focal length state (highest magnification). Table 2 shows the numerical data for the overall system Except that the second lens group 20 comprised, in order from the objective optics side, a positive lens and a cemented consisting of a positive and a negative lens, the eyepiece variable focal length optics of Example 2 had essentially the same lens configuration as that of Example 1. For variable focal length, the first and second lens groups moved in the same manner as in Example 1. The field stop S was placed 12.50 mm distant from surface no. 14 toward the objective optics.

TABLE 2

W = 1.0–0.6–0.5
fo = 500.0
fe = 24.4–11.8–8.2 (variable power ratio: 3.0)
Apparent field = 19.6°–23.2°–30.1° (half angle of view)
Eye relief = 15.3–15.1–20.8
Eyesight = −1 (m$^{-1}$)

| Surface No. | r | d | $N_d$ | v |
|---|---|---|---|---|
| 1 | 178.400 | 16.700 | 1.49700 | 81.6 |
| 2 | −198.400 | 2.400 | — | — |
| 3 | −198.400 | 6.000 | 1.67003 | 47.3 |
| 4 | −1583.300 | 218.800 | — | — |
| 5 | −171.700 | 2.600 | 1.51680 | 64.2 |
| 6 | −243.900 | 78.000 | — | — |
| 7 | ∞ | 47.600 | 1.51680 | 64.2 |
| 8 | ∞ | 7.000 | — | — |

TABLE 2-continued

W = 1.0–0.6–0.5
fo = 500.0
fe = 24.4–11.8–8.2 (variable power ratio: 3.0)
Apparent field = 19.6°–23.2°–30.1° (half angle of view)
Eye relief = 15.3–15.1–20.8
Eyesight = −1 (m$^{-1}$)

| Surface No. | r | d | $N_d$ | ν |
|---|---|---|---|---|
| 9 | ∞ | 53.600 | 1.51680 | 64.2 |
| 10 | ∞ | 50.125–44.107–42.058 | — | — |
| 11 | −18.907 | 6.000 | 1.84666 | 23.8 |
| 12 | −13.467 | 2.500 | 1.58913 | 61.2 |
| 13 | 55.762 | 26.209–56.344–75.002 | — | — |
| 14 | 261.870 | 6.200 | 1.69680 | 55.5 |
| 15 | −55.048 | 0.300 | — | — |
| 16 | 50.165 | 13.700 | 1.58913 | 61.2 |
| 17 | −32.500 | 2.300 | 1.84666 | 23.8 |
| 18 | −73.562 | 41.731–17.614–1.000 | — | — |
| 19 | −21.988 | 5.000 | 1.62041 | 60.3 |
| 20 | 33.299 | — | — | — |

EXAMPLE 3

Figure 9:
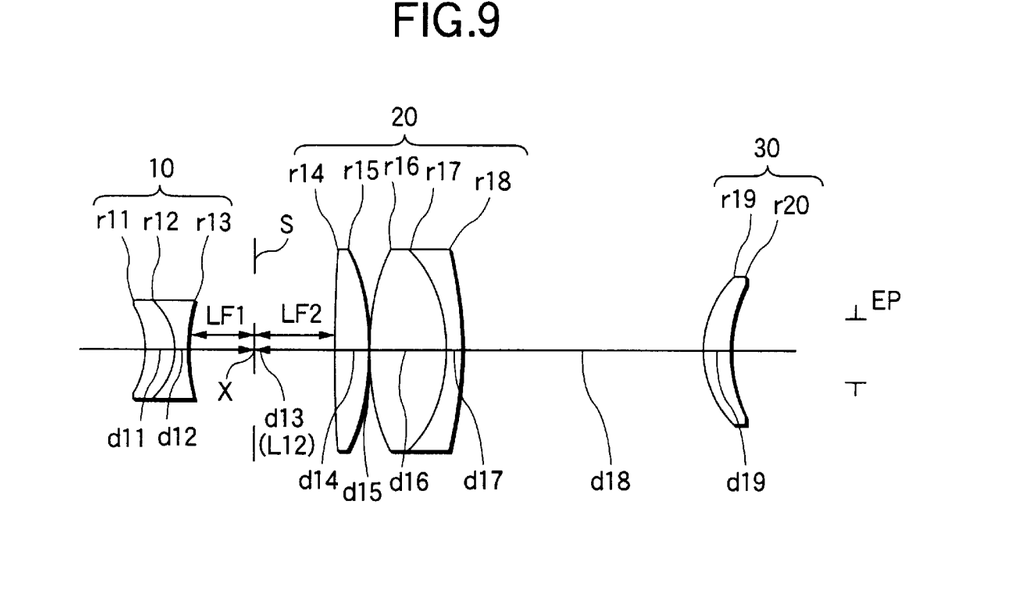
FIG. 9 shows the lens configuration of the eyepiece variable focal length optics fabricated in Example 3 of the invention.
Figure 10:
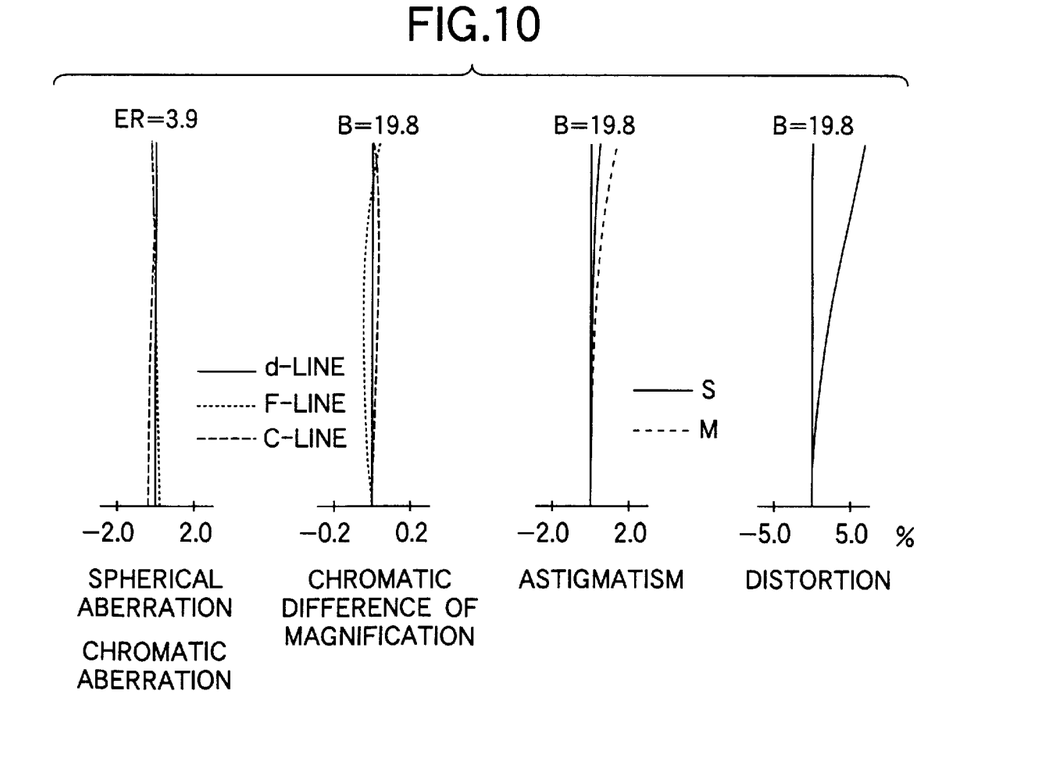
FIG. 10 is a set of graphs plotting the aberrations that occurred to a system comprising objective optics and the lens configuration of FIG. 9 as the optics of FIG. 9 was set at a longest focal length state (to provide the lowest magnification)
Figure 11:
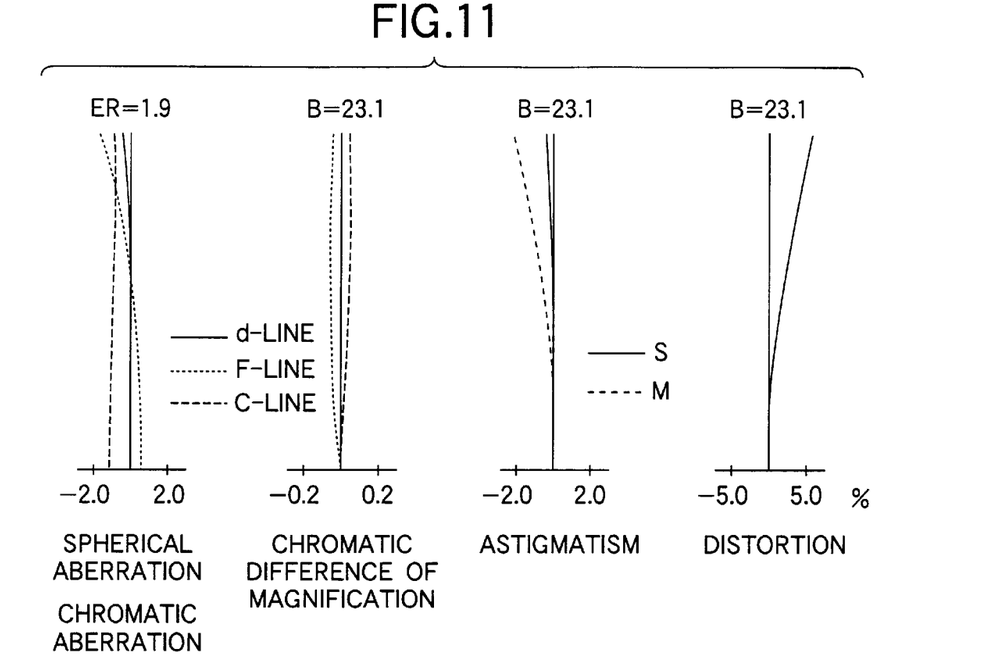
FIG. 11 is a set of graphs plotting the aberrations that occurred to the same system as the optics of FIG. 9 was set at a medium focal length state.
Figure 12:
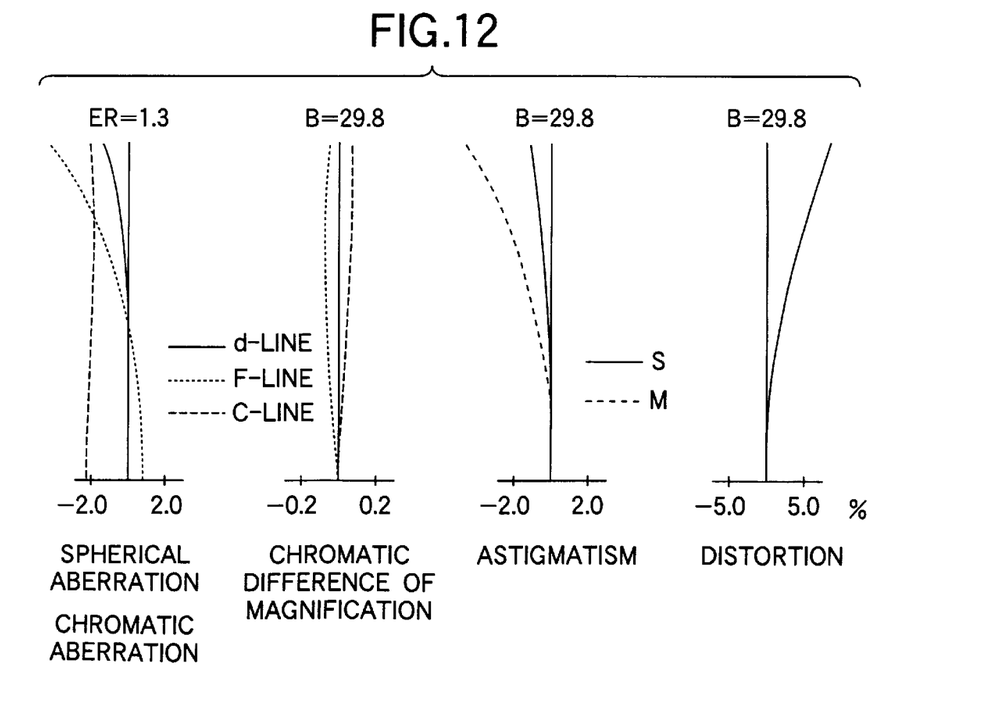
FIG. 12 is a set of graphs plotting the aberrations that occurred to the same system as the optics of FIG. 9 was set at a shortest focal length state (to provide the highest magnification)

FIG. 9 shows the lens configuration of the eyepiece variable focal length optics of Example 3 as it is set at a longest focal length state (lowest magnification). FIGS. 10, 11 and 12 are diagrams plotting the aberrations that occurred to the sane eyepiece variable focal length optics in combination with the objective optics as the eyepiece variable focal length optics was respectively set at the longest focal length state, a medium focal length state (medium magnification) and a shortest focal length state (highest magnification). Table 3 shows the numerical data for the overall system. The eyepiece variable focal length optics of Example 3 had essentially the same lens configuration as that of Example 2. For variable focal length, the first and second lens groups moved in the same manner as in Example 2. The field stop S was placed 14.35 mm distant from surface no. 14 toward the objective optics.

TABLE 3

W = 1.0–0.6–0.5
fo = 500.0
fe = 24.4–11.9–8.3 (variable power ratio: 3.0)
Apparent field = 19.8°–23.1°–29.8° (half angle of view)
Eye relief = 15.0–14.5–20.7
Eyesight = −1 (m$^{-1}$)

| Surface No. | r | d | $N_d$ | ν |
|---|---|---|---|---|
| 1 | 178.400 | 16.700 | 1.49700 | 81.6 |
| 2 | −198.400 | 2.400 | — | — |
| 3 | −198.400 | 6.000 | 1.67003 | 47.3 |
| 4 | −1583.300 | 218.800 | — | — |
| 5 | −171.700 | 2.600 | 1.51680 | 64.2 |
| 6 | −243.900 | 78.000 | — | — |
| 7 | ∞ | 47.600 | 1.51680 | 64.2 |
| 8 | ∞ | 7.000 | — | — |
| 9 | ∞ | 53.600 | 1.51680 | 64.2 |
| 10 | ∞ | 51.208–44.696–42.568 | — | — |
| 11 | −18.240 | 6.000 | 1.84666 | 23.8 |
| 12 | −13.500 | 2.500 | 1.58913 | 61.2 |
| 13 | 59.835 | 22.550–55.102–73.882 | — | — |
| 14 | 247.834 | 6.466 | 1.69680 | 55.5 |
| 15 | −54.858 | 0.300 | — | — |
| 16 | 47.206 | 14.546 | 1.58913 | 61.2 |
| 17 | −32.500 | 2.300 | 1.84666 | 23.8 |
| 18 | −75.809 | 40.684–17.639–1.000 | — | — |

TABLE 3-continued

W = 1.0–0.6–0.5
fo = 500.0
fe = 24.4–11.9–8.3 (variable power ratio: 3.0)
Apparent field = 19.8°–23.1°–29.8° (half angle of view)
Eye relief = 15.0–14.5–20.7
Eyesight = −1 (m$^{-1}$)

| Surface No. | r | d | $N_d$ | ν |
|---|---|---|---|---|
| 19 | 22.906 | 5.000 | 1.62041 | 60.3 |
| 20 | 33.300 | — | — | — |

EXAMPLE 4

Figure 13:
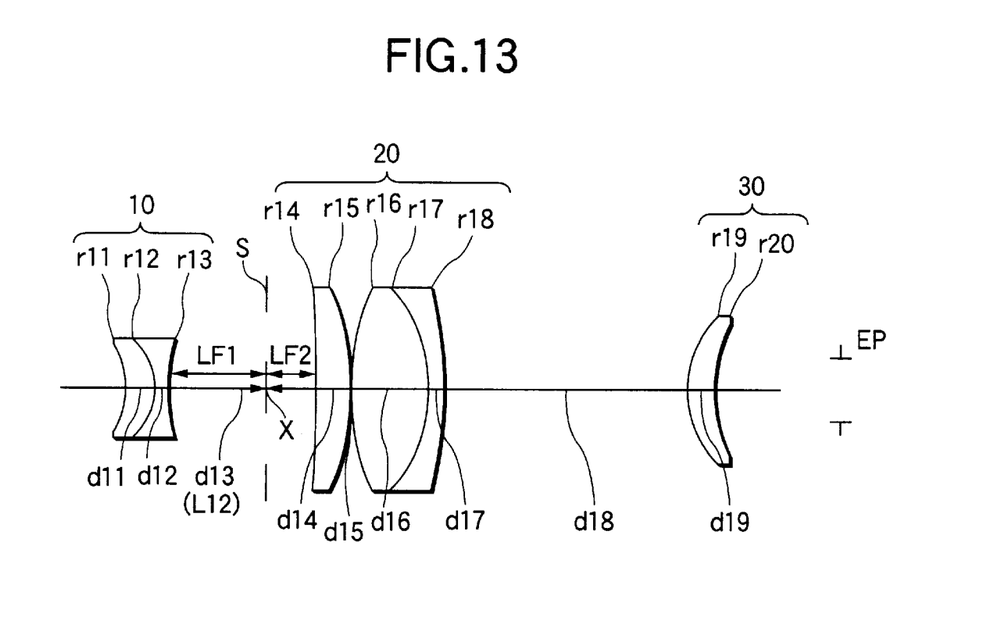
FIG. 13 shows the lens configuration of the eyepiece variable focal length optics fabricated in Example 4 of the invention.
Figure 14:
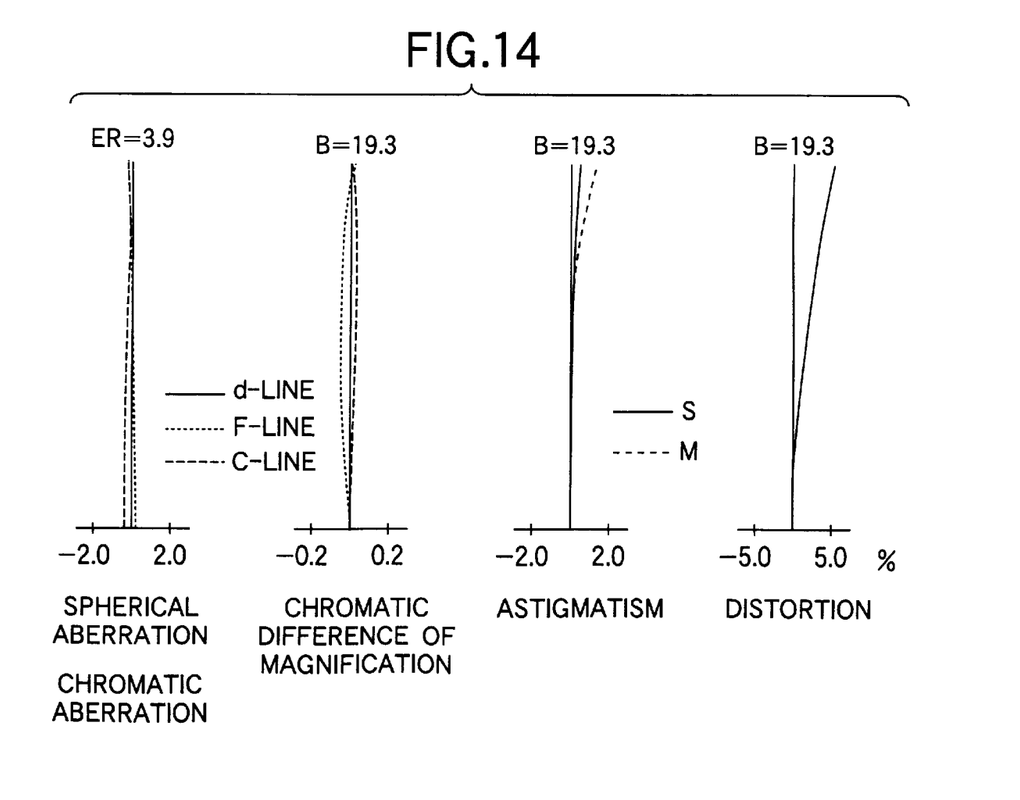
FIG. 14 is a set of graphs plotting the aberrations that occurred to a system comprising objective optics and the lens configuration of FIG. 13 as the optics of FIG. 13 was set at a longest focal length state (to provide the lowest magnification)
Figure 15:
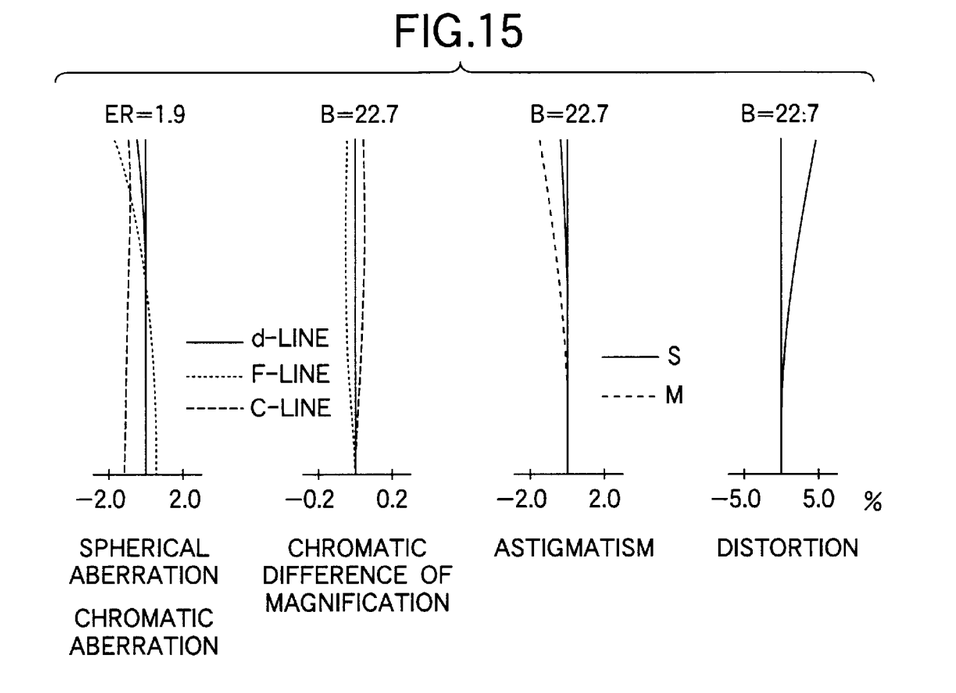
FIG. 15 is a set of graphs plotting the aberrations that occurred to the same system as the optics of FIG. 13 was set at a medium focal length state.
Figure 16:
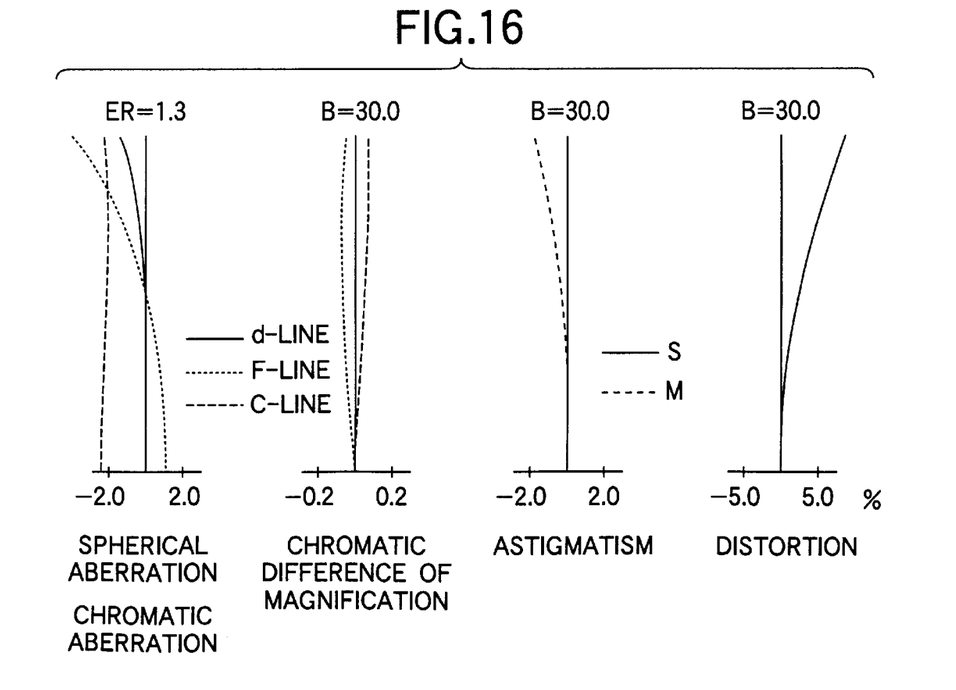
FIG. 16 is a set of graphs plotting the aberrations that occurred to the same system as the optics of FIG. 13 was set at a shortest focal length state (to provide the highest magnification)

FIG. 13 shows the lens configuration of the eyepiece variable focal length optics of Example 4 as it is set at a longest focal length state (lowest magnification). FIGS. 14, 15 and 16 are diagrams plotting the aberrations that occurred to the same eyepiece variable focal length optics in combination with the objective optics as the eyepiece variable focal length optics was respectively set at the longest focal length state, a medium focal length state (medium magnification) and a shortest focal length state (highest magnification). Table 4 shows the numerical data for the overall system. The eyepiece variable focal length optics of Example 4 had essentially the same lens configuration as that of Example 2. For variable focal length, the first and second lens groups moved in the same manner as in Example 2. The field stop S was placed 7.70 mm distant from surface no. 14 toward the objective optics.

TABLE 4

W = 1.0–0.6–0.5
fo = 500.0
fe = 24.6–12.0–8.2 (variable power ratio: 3.0)
Apparent field = 19.3°–22.7°–30.0° (half angle of view)
Eye relief = 15.2–15.7–20.6
Eyesight = −1 (m$^{-1}$)

| Surface No. | r | d | $N_d$ | ν |
|---|---|---|---|---|
| 1 | 178.400 | 16.700 | 1.49700 | 81.6 |
| 2 | −198.400 | 2.400 | — | — |
| 3 | −198.400 | 6.000 | 1.67003 | 47.3 |
| 4 | −1583.300 | 218.800 | — | — |
| 5 | −171.700 | 2.600 | 1.51680 | 64.2 |
| 6 | −243.900 | 78.000 | — | — |
| 7 | ∞ | 47.600 | 1.51680 | 64.2 |
| 8 | ∞ | 7.000 | — | — |
| 9 | ∞ | 53.600 | 1.51680 | 64.2 |
| 10 | ∞ | 48.931–43.398–41.212 | — | — |
| 11 | −19.435 | 6.000 | 1.84666 | 23.8 |
| 12 | −13.500 | 2.500 | 1.62041 | 60.3 |
| 13 | 88.080 | 24.280–54.249–73.370 | — | — |
| 14 | −243.141 | 6.844 | 1.69680 | 55.5 |
| 15 | −45.595 | 0.300 | — | — |
| 16 | 48.600 | 12.725 | 1.58913 | 61.2 |
| 17 | −32.500 | 2.300 | 1.84666 | 23.8 |
| 18 | −66.166 | 42.510–18.086–1.000 | — | — |
| 19 | 20.532 | 5.000 | 1.62041 | 60.3 |
| 20 | 33.300 | — | — | — |

The values of $f_3/f_2$, $L_{12}/f(h)$ and $f_2/f_{2-1}$ were calculated in Examples 1–4 to see if they satisfied conditions (1)–(3), respectively. The results are shown in Table 5.

TABLE 5

|  | Condition (1) | Condition (2) | Condition (3) |
|---|---|---|---|
| Example 1 | 3.17 | 9.8 | 0.45 |
| Example 2 | 2.60 | 9.15 | 0.52 |
| Example 3 | 2.97 | 8.89 | 0.52 |
| Example 4 | 2.14 | 8.92 | 0.44 |

Obviously, all of conditions (1)–(3) were satisfied in each Example and aberrations were corrected in a fairly satisfactory manner.

According to the invention, there is provided eyepiece variable focal length optics that achieves a variable power ratio of about three and which yet is compact and allows for adequately large apparent visual field and eye relief.

What is claimed is:

1. Eyepiece variable focal length optics which comprises, in order from objective optics with which it is used in combination, a negative first lens group, a positive second lens group and a positive third lens group, the first and second lens groups moving in opposite directions along an optical axis during variable focal length but the third lens group being stationary, and the eyepiece variable focal length optics satisfying the following conditions (1) and (2):

$$2.0 < f_3/f_2 < 4.0 \tag{1}$$

$$7.0 < L_{12}/f(h) \tag{2}$$

where $f_2$ is the focal length of the second lens group, $f_3$ is the focal length of the third lens group, f(h) is the shortest focal length of the overall eyepiece variable focal length optics, and $L_{12}$ is the axial air gap between the first and second lens groups at the shortest focal length.

2. The eyepiece variable focal length optics according to claim 1, wherein said second lens group contains at least two positive lens elements and satisfies the following condition (3):

$$0.3 < f_2/f_{2-1} < 0.6 \tag{3}$$

where $f_{2-1}$ is the focal length of the positive lens in the second lens group which is positioned the closest to the objective optics.

3. The eyepiece variable focal length optics according to claim 1, wherein said second lens group contains at least two positive lens elements and satisfies the following condition (3):

$$0.3 < f_2/f_{2-1} < 0.6 \tag{3}$$

where $f_{2-1}$ is the focal length of a cemented lens partially formed by the positive lens in the second lens group which is positioned the closest to the objective optics.

* * * * *